May 7, 1940.   C. B. SCHEIBELL   2,199,419
CAMERA MAGAZINE EJECTOR
Original Filed April 18, 1935   2 Sheets-Sheet 1
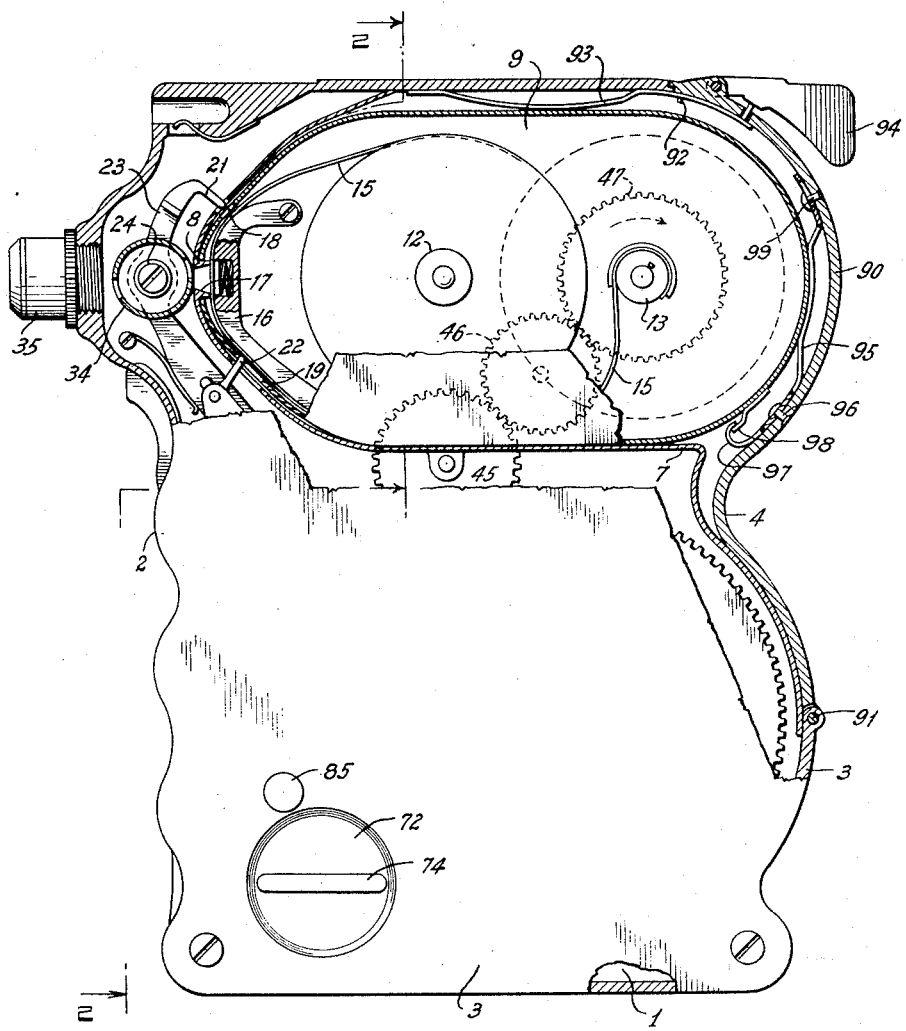
INVENTOR.
Gordon Brown Scheibell
BY
Wm. J. Herdman
ATTORNEY.

May 7, 1940.  C. B. SCHEIBELL  2,199,419
CAMERA MAGAZINE EJECTOR
Original Filed April 18, 1935   2 Sheets-Sheet 2
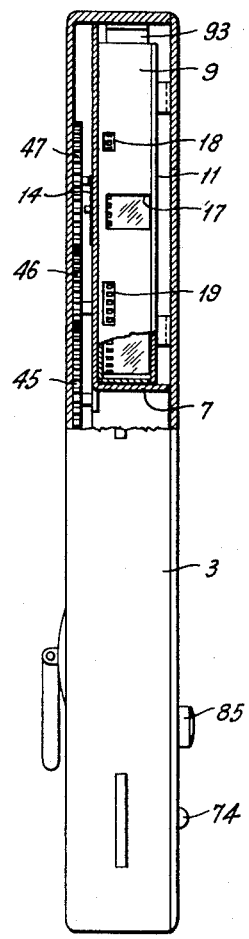
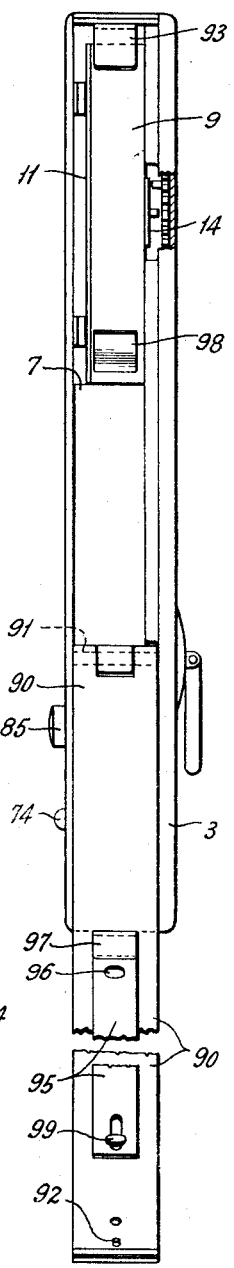
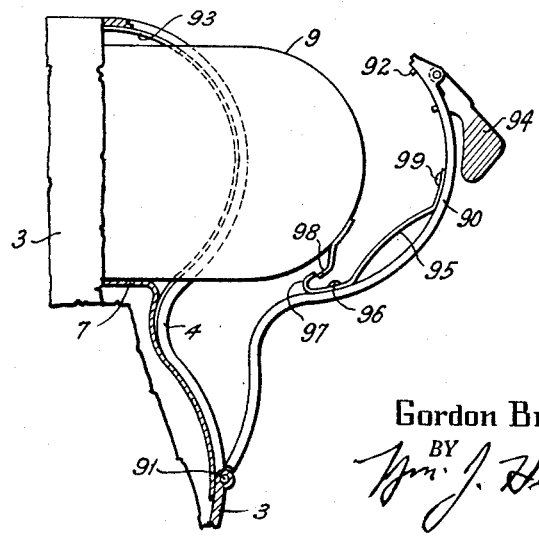
INVENTOR.
Gordon Brown Scheibell
BY
Wm. J. Herdman
ATTORNEY.

Patented May 7, 1940

2,199,419

UNITED STATES PATENT OFFICE 2,199,419

CAMERA MAGAZINE EJECTOR

Gordon Brown Scheibell, Millburn, N. J.; William O. Scheibell, administrator of said Gordon B. Scheibell, deceased Original application April 18, 1935, Serial No. 16,955. Divided and this application April 30, 1936, Serial No. 77,233

5 Claims. (Cl. 88—17)

My invention relates broadly to film apparatus and more particularly to a construction of magazine film apparatus with means for inserting and removing the magazine with respect to a mounting structure, this being a division of my application Serial No. 16,955, filed April 18, 1935.

The principal object of the invention comprises providing a form of film apparatus having a film carrier and an arrangement for moving the film carrier with reference to an operative position in an exposure process.

This and other objects will be apparent from the following, reference being had to the accompanying drawings in which like reference numerals designate corresponding parts and in which:

Fig. 1 is a partially sectioned side view of one embodiment of the cinematograph apparatus of my invention;

Fig. 2 is a front partially sectional view of the structure of the invention;

Fig. 3 is a rear elevation of the representation of Fig. 1, with a compartment closure member thereof in open position;

Fig. 4 is a view of a portion of the apparatus showing the operation of a mechanism for extracting the film magazine.

In accordance with the invention an arrangement is provided for permitting facile removal and substitution of the film cartridges or magazines as required.

Referring to the drawings in detail there is provided a substantially flat box-like container 1, the lower portion of which has an outer contour in the form of a pistol grip to fit the hand. The front wall 2 of the housing 1 has convolutions to fit the fingers while the rear wall 3 is provided with a reduced portion 4 to accommodate the thumb so that the hand of the user can easily grasp the casing. In the upper portion of the casing 1 there is provided a wall member 7 which is in the form of a projectile-shaped compartment for receiving the film magazine. In the nose portion of this magazine receiving compartment there is provided an aperture plate 8 for defining the picture area upon the sensitized film of the magazine.

A film-containing magazine is provided and is of a projectile form to fit within the magazine-receiving compartment. This magazine comprises two portions including a container 9 and lid 11 therefor, while within the container 9 are two rotatable reel elements 12 and 13. The reel element 13 has its spindle extending through the side wall of the container 9 and is provided with a rotatable element 14, as may be seen in Fig. 3, to engage with a rotatable take-up drive member mounted in the camera structure. It will of course be understood that the reel element 13 is provided with a suitable clutch arrangement, such as an intermediate spring drive, to permit of a proper take-up operation.

A film guide member 16 is mounted within the container 9 and has its outer surface formed to correspond with the inner contour of the container 9 to feed the film from reel element 12 to reel element 13 along the ogival area of the projectile-shaped nose of the magazine. An aperture opening 17 is provided in the container 9, as may be seen in Fig. 2, to receive the aperture plate 8. A resilient arrangement is provided as part of the guide members 16 to gently press the film 15 against the aperture plate system, when the magazine is in operative position within the magazine compartment. The sensitized film 15, initially stored upon the reel element 12 and fed to the take-up reel element 13, is provided with but a single row of perforations to permit of a flatter and more compact construction of the camera and magazine.

The camera is accordingly provided with a special arrangement of perforation engaging means to impart the proper intermittent feed motion to the film in an exposure process. It will be noted in Fig. 2 that the magazine container 9 is provided with apertures 18 and 19, respectively, in alignment upon opposite sides of the aperture 17. These apertures are provided in flat portions of the container 9 which portions are disposed at substantially 90° with respect to each other, the portion of the container 9 immediately surrounding the aperture 17 being flat and disposed substantially 45° with respect to either of the surfaces bearing the apertures 18 and 19. The aperture 18 engages with the row of perforations of the film 15 to permit access to the film by a pilot pin 21 while the aperture 19 permits access to the perforations by a pull-down claw 22.

The pilot pin 21 is mounted upon a reciprocative member 23 having a pivot bearing 24. The detailed construction of the film advancing and driving mechanism is shown in the copending application to which reference has already been made. Gear 46 engages the gear teeth of take-up drive means 47 which has a fin for engaging the element 14 on the magazine to impart rotary motion to the take-up reel element 13. The gear 46 is driven by the gear 45 which forms part of the film advancing mechanism.

The compartment formed by the member 7 is made light-tight by a door 90 having a hinge 91 forming a pivot mounting upon the casing 1. The door 90 is held in closed position by a pin 92 which engages with a hole in a spring 93 mounted in the top wall of the compartment formed by member 7. This spring 93 serves another purpose in applying a downward pressure to the magazine container 9 to force the film into a proper recording position. A manually movable element 94 is pivoted to the door 90 and has an inwardly extending portion operating through a hole in the door 90 to depress the projecting end of the spring 93 sufficiently to permit the door 90 to be opened by angular movement about the hinge 91.

In accordance with my invention, a special mechanical arrangement is provided for permitting the convenient removal of the magazine from the compartment when the door is open, whereby the operator can quickly and easily grasp the magazine to permit of its instant withdrawal. In accordance with this arrangement, a flat elongated spring member 95 is secured to the inner portion of the door by the rivet 96. One end of the spring 95 is curled to form a finger 97 which engages with the complementary resilient catch member 98 mounted on the container 9. The other end of the spring 95 is provided with a slot through which a pin 99 extends from the door 90. This slot permits the free movement of one end of the spring 95 when the door 90 is in closed position so that the spring 95 resiliently presses against the rear end of container 9 to force the magazine into a proper frontward operative position. When the magazine has been manually inserted in the compartment 7, the door 90 may be swung about its hinge 91 to a closed position. In this closed position the end 97 of spring 95 will resiliently snap into engagement with the catch member 98 on the container 9. When it is desired to remove the magazine, the door 90 may be released by the member 94 and angularly moved about the hinge 91 whereupon the finger 97, in engagement with the catch 98, will rectilinearly partially withdraw the magazine from the magazine compartment.

Referring to Fig. 4, when the door 90 has angularly moved to the position shown, the finger 97 will resiliently slip out of engagement with the catch 98 and permit the door 90 to be moved into its lowered extreme position. The magazine will then have been partially ejected from the compartment so that the operator or user can easily grasp the same and effect its complete withdrawal. Conversely, when it is desired to insert the magazine, it is not necessary for the operator to push the magazine to its extreme forward position inasmuch as the mere closing of the door will effect the proper positioning of the magazine within the compartment.

Although I have described a preferred embodiment of the apparatus, it will of course be understood that various changes can be made without departing from the scope of my invention. I do not, therefore, desire to limit myself except as may be pointed out in the appended claims.

What I claim as new and desire to secure by Letters Patent of the United States is:

1. Film apparatus comprising, a structure having a compartment in which an optical system and film driving means are provided, a film magazine insertable in said compartment in operative position in engagement with said optical system and film driving means for feeding said film in a light exposure process, a door for said compartment, and a resilient strip carried by said door, said strip being fixed to said door adjacent one end and being slidably engaged by the door adjacent the opposite end, said strip being bowed outwardly intermediate the points of engagement with said door for engaging parts of said magazine to yieldably maintain the same in operative position, a hook member on said magazine and a coacting hook on said strip engageable with the hook on said magazine to effect removal of the magazine from said compartment when said door is opened.

2. A camera having an exposure compartment, a film magazine insertable in said compartment, a swingable door carried by said camera for closing said compartment, and means carried by said door for yieldably engaging said magazine for urging said magazine to an operative position in said compartment when said door is closed and means coextensive with the aforesaid means for engaging a part of said magazine to partially withdraw said magazine from said compartment as said door is swung open, said means operating to release said magazine and said door when said door is partially swung open to permit said door to be fully opened for removal of said magazine.

3. A camera having an exposure compartment, a film magazine insertable in said compartment and including a catch element thereon, a door for said compartment, resilient means carried by said door and engageable with said catch element when said door is closed and operated by said door to move said magazine partially out of said compartment when said door is partially opened, said resilient means and catch element being disengageable when said door is fully opened to allow removal of said magazine, and means coextensive with the resilient means carried by said door for yieldably urging said magazine into said compartment when said door is closed.

4. Film apparatus having an exposure compartment, a film magazine insertable in said compartment, a hook member on said magazine, a hinged door normally closing the end of said compartment, and an extractor carried by said hinged door for withdrawing said magazine from said compartment, said extractor being detachably and resiliently engageable with the hook member on said magazine, and means coextensive with said extractor for yieldably urging said magazine to an operative position within said compartment when said hinged door is closed.

5. Film apparatus having an exposure compartment, a hinged door normally closing the end of said compartment, a film magazine insertable in said compartment and carrying a catch member, a spring hook carried by said door for engaging said catch member when said door is closed to withdraw said magazine from said compartment as said door is partially opened, and a spring strip integral with said spring hook for urging said magazine to a position within said compartment when said hinged door is closed.

GORDON BROWN SCHEIBELL.